US008639506B2

(12) United States Patent
Miro et al.

(10) Patent No.: US 8,639,506 B2
(45) Date of Patent: Jan. 28, 2014

(54) FAST PARTIAL PATTERN MATCHING SYSTEM AND METHOD

(75) Inventors: Xavier Anguera Miro, Madrid (ES); Robert Macrae, Madrid (ES)

(73) Assignee: Telefonica, S.A., Madrid (ES)

( * ) Notice: Subject to any disclaimer, the term of this patent is extended or adjusted under 35 U.S.C. 154(b) by 537 days.

(21) Appl. No.: 12/964,976

(22) Filed: Dec. 10, 2010

(65) Prior Publication Data

US 2011/0224984 A1 Sep. 15, 2011

Related U.S. Application Data

(60) Provisional application No. 61/312,809, filed on Mar. 11, 2010.

(51) Int. Cl.
*G10L 15/00* (2013.01)
(52) U.S. Cl.
USPC ............................ 704/241; 704/236; 704/231
(58) Field of Classification Search
USPC .................................................. 704/231–257
See application file for complete search history.

(56) References Cited

U.S. PATENT DOCUMENTS

| 4,570,232 | A | 2/1986 | Shikano | |
| 6,195,638 | B1 * | 2/2001 | Ilan et al. | 704/241 |
| 6,983,246 | B2 * | 1/2006 | Kepuska et al. | 704/241 |
| 7,143,034 | B2 * | 11/2006 | Jeong et al. | 704/241 |
| 7,317,999 | B2 * | 1/2008 | Ninomiya et al. | 702/76 |
| 7,739,111 | B2 * | 6/2010 | Kaneko | 704/241 |

OTHER PUBLICATIONS

International Search Report dated Jul. 14, 2011, from corresponding International Application No. PCT/EP2011/053677.
Meinard Muller, et al. "Path-Constrained Partial Music Synchronization" IEEE International Conference on Acoustics, Speech and Signal Processing, Mar. 31, 2008, pp. 65-68.
Ira Assent, et al. "Anticipatory DTW for Efficient Similarity Search in Time Series Databases" Proc. 35th International Conference on Very Large Data Bases (VLDB 2009), vol. 2, No. 1, Aug. 24, 2009, Aug. 28, 2009, pp. 826-837.
Yasushi Sakurai, et al. "FTW: Fast Similarity Search under the Time Warping Distance" Proceedings of the Twenty-Fourth ACM SIGMOD-SIGACT-SIGART Symposium on Principles of Database Systems, Jun. 13, 2005, Jun. 15, 2005, pp. 326-337.
Xavier Anguera, et al. "Partial Sequence Matching Using an Unbounded Dynamic Time Warping Algorithm" IEEE International Conference on Acoustics Speech and Signal Processing, Mar. 14, 2010, pp. 3582-3585.
Alex Park, et al. "Towards Unsupervised Pattern Discovery in Speech" Proceedings of ASRU, 2005.

* cited by examiner

*Primary Examiner* — Jesse Pullias
(74) *Attorney, Agent, or Firm* — Katten Muchin Rosenman LLP (57) ABSTRACT

Method, system and computer program for determining the matching between a first and a second sampled signals using an improved Dynamic Time Warping algorithm, called Unbounded DTW. It uses a dynamic programming algorithm to find exact start-end alignment points, unknown a priori, being the initial subsampling of the similarity matrix made via definition of optimal synchronization points, allowing a very fast process.

14 Claims, 4 Drawing Sheets

FAST PARTIAL PATTERN MATCHING SYSTEM AND METHOD

TECHNICAL FIELD

The present invention relates generally to pattern matching algorithms and more particularly to a system and method for finding matching patterns faster and computationally less expensive than the existing systems and methods.

DESCRIPTION OF THE PRIOR ART

In general, the aim of pattern matching algorithms is to find, given two sequences of n-dimensional data, any two sequences that completely or partially match each other. In addition, each of these sub-sequences can contain dissimilarities with the other sequence in terms of inserted or deleted elements (also called signal warping), which does not allow a one-to-one comparison. In the following we consider only the algorithms that are able to find matching sub-sequences of multi-dimensional, real-valued data within two longer sequences, or one sequence and one predefined pattern.

Pattern matching algorithms have application in many domains, for example in bioengineering or in music and speech processing.

In the speech domain, before the use of Hidden Markov Models (HMM) became ubiquitous, pattern matching algorithms like the well known Dynamic Time Warping (DTW) algorithm, were used for applications such as keyword recognition. The constant increase in computing power and the availability of larger labelled datasets pushed pattern matching techniques aside in favour of HMMs, as pattern matching algorithms did not scale well to having an increasing number of matching patterns. HMMs have several well known weaknesses, such as overgeneralization and the need to have labelled training data, limiting their suitability for some applications.

A few researchers have recently turned their eyes back to pattern matching algorithms for tasks such as template based speech recognition, music synchronization and unsupervised pattern discovery in speech, among others. The Dynamic Time Warping (DTW) algorithm tries to find, given two sequences, the optimum path between their start and end points via a dynamic programming technique.

DTW-based solutions have drawbacks that have limited the scope of their applicability in real-life problems. The standard DTW algorithm assumes that: (1) the start and end points need to be known a priori; (2) the cost matrix between both sequences needs to be fully computed in order to find the optimum warping path; (3) the alignment assumes that both sequences are complete and structurally similar representations of each other. These assumptions do not hold in many real-life applications where the sequences to be matched are within long, and very different, contexts or where structural variations such as omissions and insertions of large segments may exist between two sequences.

The DTW algorithms are very old and restricted to cases when the sequences to align start and end in common places, therefore the job is only the find the time warping inside them. Initially DTW was very slow as all possible paths needed to be computed, but some papers proposed speedups in terms of restrictions to the possible paths, but that cannot be applied for a general case like the one in this invention When dealing with symbolized data, in the bioengineering area several algorithms have been proposed (like the LCS, Longest Common Subsequence algorithm) that allow for the matching of sub-sequences within one or more longer sequences and allows for insertions and deletions to take place. The application of these algorithms in real-value data involved a prior transformation of such data into symbols, jeopardizing the accuracy of the matching. In addition, these algorithms require the computation of a distance (in this case called Edit distance) between each pair of symbols, which is computationally intensive.

Next we review some of the existing alternatives for matching multi-dimensional real-valued data, which allow for some warping. In Meinard Müller, "*Information Retrieval for music and Motion*", Springer, hardcover edition, 2007 and Meinard Müller and Daniel Appelt, "*Path-constrained partial music synchronization,*" in *Proc. ICASSP,* 2008, Müller et al. they propose an algorithm for music alignment (called Segmental DTW) that iteratively searches for matching sub-sequences between two music pieces. The Segmental-DTW algorithm is proposed as a slight modification of the standard DTW to allow searching for a keyword within a long sequence.

Additionally, in Alex Park and James Glass "Towards unsupervised pattern discovery in speech", in Proceedings of ASRU 2005, they propose a solution applicable to speech by iteratively conducting standard DTW in constrained possible paths between two sequences, finally selecting the longest and most similar one.

Generally, all these DTW improvements suffer from the need to compute all frame-pair similarities in the similarity matrix before searching for aligned sequences, which becomes intractable for large segments, with quadratic time costs. Therefore, if the original segments are long they need to be split into smaller pieces before running any of the previously mentioned algorithms.

The innovation proposed here allows for the matching of two multi-dimensional real-valued sequences, finding the subsequences (one or several) within them with most similarity. It can be applied to speech data but is not restricted to it. The main differences with existing solutions is that it is much faster to compute (as it does not compute all possible similarities) and does not restrict how many subsequences can be found in one iteration of the algorithm, neither where their start-end points are.

SUMMARY OF THE INVENTION

The present invention proposes a novel pattern matching method and system for sequences called Unbounded Dynamic Time Warping (U-DTW) which effectively solves the aforementioned limitations. The present invention has the following main properties:

It allows to find one or multiple matching subsequences within two sequences of multi-dimensional (also applicable to a single dimension) real-valued data. One can use any standard similarity metric between two vectors as the similarity between elements in the two sequences.

A fast implementation algorithm allows to find the matching sub-sequences without computing all similarities between the two sequences, therefore eliminating the exhaustive computation of the entire cost matrix at start. Via the definition of a the minimum length $L_{min}$ that a matching subsegment is expected to have, the algorithm determines a subset of possible matching positions between both sequences, avoiding the computation of unnecessary similarities outside of these.

Such algorithm does not need to know the start-end positions of the matching segments (if any) inside the two sequences. It finds them by using a forward implementation of a dynamic programming algorithm similar to that used in the standard DTW implementations Consequently, according to the invention, a method, system and computer program according to the independent claims are provided. Favorable embodiments are defined in the dependent claims.

In a first aspect a method of determining the matching between a first and a second sampled signals using a Dynamic Time Warping algorithm wherein the matching is determined by finding the optimal paths through a matrix of points representing possible time alignments between the signals is proposed.

The method comprising the following steps:

Generating a sequence of first feature vectors $U:=(u_1; u_2; \ldots; u_M)$ and second feature vectors $V:=(v_1; v_2; \ldots; v_N)$ that represent temporal and spectral behaviour of the first and second signals respectively Setting a global similarity matrix $D_g(m; n)$ and a length matrix $M(m;n)$ as empty at start up.

Defining appropriate synchronization points, SP, in locations (m,n)

Calculating the similarity $S(m;n)$ for these synchronization points, wherein $S(m; n)$ is defined between any two feature vectors, $u_m$ and $v_n$, as the distance between said vectors For each synchronization point, m;n Set $M(m;n)=1$ Apply the forward path algorithm for said point For all paths found in the previous step whose length exceeds the minimum length $L_{min}$ (being $L_{min}$ a predefined parameter), apply the backward path algorithm for the synchronization point where the path starts, Select the longest of all paths that pass through the considered SP and return the total path (backwards and forwards) and its average score if it exceeds the minimum length $L_{min}$ in both dimensions, wherein the path algorithm comprises the following steps:

For the considered point (m; n), set (m'; n')=(m; n)+(i; j), where $(i;j) \in \{(1; 1); (1; 2); (2; 1) \ldots ;(r; r-1)\}$ for the forward path and $(i;j) \in \{(-1;-1); (-1;-2); (-2;-1) \ldots (-s;-(s-1))\}$ for the backward path where r and s are is a predefined parameter for each considered value of (m';n') if the following conditions are met:

The normalized global similarity score of the current path is greater than any previous paths (if any) at that location, i.e.:

$$\frac{Dg(m, n) + S(m', n')}{M(m, n) + 1} > \frac{Dg(m', n')}{M(m'n')}$$

if there is no previous paths at that location (M(m',n') =0), only the second condition is evaluated:

The normalized global similarity is greater than a predefined cutoff threshold Thr, i.e.:

$$\frac{Dg(m, n) + S(m', n')}{M(m, n) + 1} > Thr$$

a new frame-pair position (m'; n') is added to the currently considered path; M(m', n') is set to M(m, n)+1; Dg(m', n') is set to Dg(m, n)+S(m', n') and the algorithm is again applied from the point m';n', i.e. the new point m;n considered is m;n=m';n'

In another aspect, a system comprising means adapted to perform the above-described method is presented.

Finally, a computer program comprising computer program code means adapted to perform the above-described method is presented.

For a more complete understanding of the invention, its objects and advantages, reference may be had to the following specification and to the accompanying drawings,

BRIEF DESCRIPTION OF THE DRAWINGS

To complete the description and in order to provide for a better understanding of the invention, a set of drawings is provided. Said drawings form an integral part of the description and illustrate a preferred embodiment of the invention, which should not be interpreted as restricting the scope of the invention, but rather as an example of how the invention can be embodied. The drawings comprise the following figures.

Corresponding numerals and symbols in the different figures refer to corresponding parts unless otherwise indicated.

DETAILED DESCRIPTION OF THE INVENTION

The pattern matching method disclosed in the present invention, is considered unbounded from three perspectives: (1) start-end, as U-DTW does not pose any restrictions on the start-end positions of the audio patterns that need to be matched; (2) number of matches, as more than one matching segments may be found with a single pass of the algorithm, returning their start-end locations and matching score; and (3) speed, as it uses a search method that avoids unnecessary comparisons, speeding up the algorithm.

Two conditions are imposed on the signal in order to lower false alarm matches. First, a minimum length is required. UDTW only considers matching sequences that are longer than a minimum length $L_{min}$ (typically set around 500 ms). Second, a maximum time warping of 2 times (and minimum of ½ times) the original signal, is required by defining proper local constraints.

Given two sequences $X_U$ and $X_V$ (although in some of the examples, the invention is applied to acoustic sequences, the invention is not limited to that type of sequences), their feature sequences are given by $U:=(u_1; u_2; \ldots; u_M)$ and $V:=(v_1; v_2; ; V_N)$. The similarity $S(m; n)$ is defined between any two feature vectors, $u_m$ and $v_n$, with $m \in [1:M]$ and $n \in [1:N]$, as the distance between said vectors. For this embodiment, the normalized inner product (or cosine of the angle θ between the vectors):

$$S(m; n) = \cos\theta = \frac{\langle um, vn \rangle}{\|um\|\|vn\|},$$

will be used (but any other distance or similarity measure between two vectors could be used).

This algorithm like other DTW algorithms, finds the optimal path (optimal alignment) through a matrix of points representing possible time alignments between the signals.

Unlike other DTW-based algorithms, the similarities are computed only when needed, according to the forward-backward path finding algorithm and the definition of the synchronization points, which brings significant computational savings. Additionally and in order to further speed up the processing time, two matrices are defined: (1) a global similarity matrix $D_g$ (m; n) that contains the optimum path accumulated similarity at each location (m; n); and (2) a matrix M(m; n) that keeps the length of the optimal paths up to each location (m; n). All these matrices are empty at start up.

The pseudo-code of the U-DTW algorithm is:

```
Define appropriate synchronization points in locations (m;n).
Compute the similarities
for these points and populate S(m;n) and set M(m;n)=1 for
the synchronization points
For each synchronization point considered
    Apply forward path algorithm
End For
For all paths found in the forward pass whose Length is >Lmin do
    Apply backward path algorithm for the Synchronization points
    where the path
starts
    If Resulting Path Length > Lmin then
        Register found paths's start-end points and score
    End if
End For
```

Figure 1:
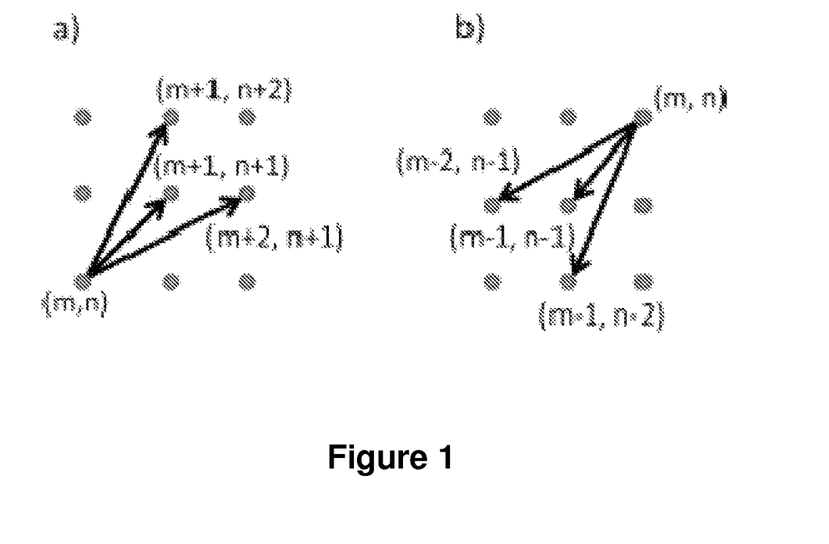
FIG. 1 represents the allowed frame jumps in a preferred embodiment of the proposed Unbounded DTW Algorithm.

The allowed frame jumps (i.e. local constraints) considered in the U-DTW algorithm, for both the forward (a) and backward (b) path algorithms are shown in FIG. 1. Note that these local constraints differ from the standard DTW in that the next points are considered at each step, and not the previous ones. Note also that neither strict insertion nor strict deletion steps are allowed (unlike the classical DTW algorithm), which allows at most 2 times and ½ times warping of one signal to the other. This limitation is not unrealistically restrictive in the case of spontaneous speech and turns out to be very useful to avoid long consecutive insertions/deletions given that no global constraints are applied.

One of the key steps in the U-DTW algorithm is the proper selection of the synchronization points (SPs) which the forward path algorithm uses as starting points (where M(m;n)≠0) to look for paths that imply matching segments (i.e. points where initial possible matching between the two sequences is evaluated, skipping initial computation of similarities between all points) Given that matching segments can occur anywhere within the two sequences compared, instead of considering all locations as possible start points we take advantage of the constraint that any matching segments needs to have a minimum length by looking at fewer locations (the SP) and ensuring that, if there is a matching segment, it will be found. This means that both the accuracy and the speed of the algorithm depend on the accurate selection of SP: sparse SPs increase the processing speed at the expense of possibly missing matching segments, whereas dense SPs are computationally more expensive to process.

The position of such synchronization points is determined by the minimum matching length defined. Two possible (but not limited to) mechanisms are proposed to describe such synchronization points: by defining horizontal and diagonal synchronization bands.

Horizontal Bands: Given any frame-pair location (m; n) with m∈1 . . . M and n∈1 . . . N, the horizontal bands approach (see FIG. 2a) defines SPs at positions m=1 . . . M for n=$\tau_h$k with $$k = 0 \ldots \frac{N}{\tau h}$$

and $\tau_h$ being the vertical separation between bands, a design parameter.

Diagonal Bands: Similarly, the diagonal bands approach (see FIG. 2b) defines SPs at positions where m+n=k$\tau_d$ where $$k = 0 \ldots \frac{\max(M; N)}{\tau d}$$

for all possible values of (m; n) within the matrix.

Figure 2:
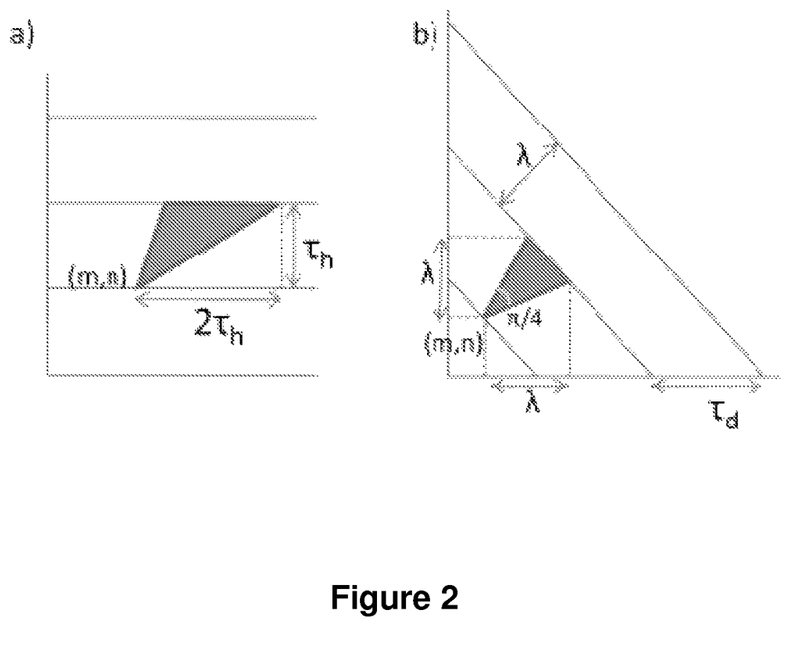
FIG. 2 represents the Horizontal (a) and Diagonal (b) bands approach to define the Synchronization Points.

The values of $\tau_h$ and $\tau_d$ determine the maximum lengths ($\Delta U_{h,d}^{max}$ and $\Delta V_{h,d}^{max}$) a matching segment can take in either sequence between two SP bands. FIG. 2 shows all possible segments from one SP band to the other, for both considered methods. Taking segment U in the horizontal axis and V in the vertical and given the maximum angle π/4 the paths can deviate from the diagonal (due to the local constraints used), in FIG. 2a we can obtain that for the horizontal banding $\Delta U_h^{max}=½$ and $\Delta V_h^{max}=\tau_h$. Similarly, in FIG. 2b we can obtain for the diagonal bands $$\Delta U_d^{max} = \Delta V_d^{max} = \frac{2}{\sqrt{(2)}}\tau d$$

where λ is the distance in diagonal between bands.

In order to minimize missed matching patterns, parameters $\tau_h$ and $\tau_d$ need to be defined according to the desired minimum matching segment length $L_{min}$. Similarly, they determine the minimum length of a matching segment after the forward path in order to be considered for the backward path.

Forward—Backward Paths Algorithm:

These dynamic programming algorithm find possible paths that originate at the synchronization points whose average overall path similarity is above a predefined cut-off threshold. It differs from standard DTW-like dynamic programming in that only points that can extend the existing paths are considered and by an average-similarity-based path-pruning criterion.

For any considered frame-pair location (m; n), the forward and backward path algorithms check whether the current path can be extended to any of the surrounding frame-pair locations, conditioned to the local constrains seen in FIG. 1.

Particularly, given (m'; n')=(m; n)+(i; j) where (i; j)∈{(1; 1); (1; 2); (2; 1)} for the forward path, and (i; j)∈{(−1;−1); (−1;−2); (−2;−1)} for the backward path, a new frame-pair position (m'; n') is added to the currently considered path if the following conditions are met:

The normalized global similarity score of the current path is greater than any previous paths (if any) at that location, i.e. if there is no previous paths at that location (M(m',n')=0), only the second condition is evaluated:

$$\frac{Dg(m, n) + S(m', n')}{M(m, n) + 1} > \frac{Dg(m', n')}{M(m'n')}$$

The normalized global similarity is greater than a predefined cut-off threshold Thr.

$$\frac{Dg(m, n) + S(m', n')}{M(m, n) + 1} > Thr$$

If successful, we set: M(m', n')=M(m, n)+1 and Dg(m', n')=Dg(m, n)+S(m', n') and the algorithm is again applied from the point m',n', i.e. the new m,n considered is m,n=m'n'. Such process is done iteratively while the conditions are met. Note how Eq. 1 allows us to obtain the optimum DTW path without the need to backtrack, which is the key point to find optimum alignments while avoiding the pre-computation of the entire similarity matrix S(m, n). Also note how at any given frame-pair location, the path can branch out in as many as 3 independent paths.

Any path is terminated at location (m, n) when none of the possible (m', n') meet the conditions above. If we are in the forward path step, we find the starting SP and execute from there the backward path algorithm to find the starting points. Finally, we keep the longest of all paths (or the longest N of all paths) that pass through the considered SP and we return the total path (backwards+forward) and its average score if it exceeds the minimum length $L_{min}$ in both dimensions.

This way, the U-DTW method presents the following advantages:

Automatic discovery of the start-end points of the matching sequences via a new banding process where possible starting points are defined between the two sequences.

Figure 3:
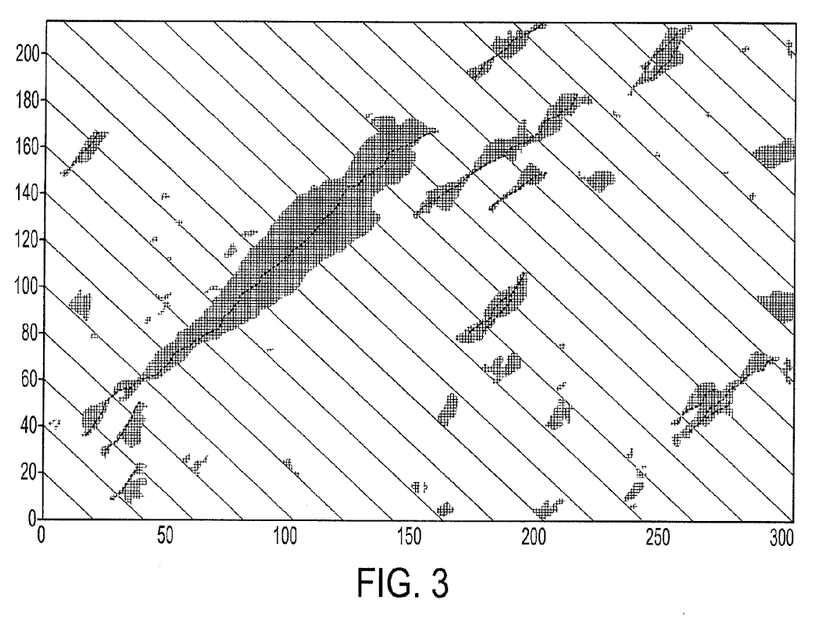
FIG. 3 shows an exemplary similarity matrix S(m, n) computed with two different recordings of the word "Barcelona" for the U-DTW algorithm using the Diagonal SP Bands Approach.

Fast computation of the matching via a forward dynamic programming that is used to find the forward matching segment and then the backward matching segment from the start point FIG. 3 shows an exemplary similarity matrix S(m, n) computed with two different recordings of the word "Barcelona", surrounded by added context. Light grey and dark grey areas indicate locations where the similarities have been computed for the forward and backward step algorithms respectively, in addition to the SP points. The chosen paths (of any length) are shown in black. Finally, white areas show where all computation has been skipped. The matching sequences are located between frames (57; 38) and (140; 130), and in this case have been correctly identified by the algorithm.

In order to test the proposed algorithm and to compare it with current state-of-the-art, we use a database recorded in-house by 23 people using an HTC-touch cell phone in a variety of office background conditions (as disclosed in Xavier Anguera and Nuria Oliver, "MAMI: Multimodal annotations on a mobile phone," in *Proc. Of Intl. Conf. on Mobile HCI* (*MobileHCI*-08), 2008). Each person recorded a total of 47 isolated words, each one repeated 5 non consecutive times, to a total of 235 recorded words per person. All files were stored at a sampling rate of 11.025 Hz with 16 bit/sample. Each file was parameterized with 10 MFCC every 10 ms and Cepstral Mean Substraction (CMS) was applied to the final features. A simple energy-based voice activity detector (VAD) was used to eliminate starting and ending non-speech regions. In order to add context to the words, two different starting and two different ending short sentences of 0.5 s to 1.8 s were recorded by a single speaker. Tested acoustic sequences $X_U$ and $X_V$ were built by appending such segments to each recorded word: $X_U[i]=start_1+word_i+end_1$ and $X_V[j]=start_2+word_j+end_2$.

Tests were performed in the following way: for each acoustic sequence $X_U[i]$ of each speaker, the best matching segment score was found with each of the acoustic sequences $X_V[j]$ by the same speaker given that i≠j, totalling 1,264,770 matching runs. Note that both $X_U[i]-VV[j]$ and $X_U[j]-VV[i]$ comparisons were computed in order to measure whether any asymmetry in the algorithm could affect the final results.

The main metric used is the matching accuracy, computed in the following manner: given a comparison on two acoustic sequences $X_U[i]$ and $X_V[j]$, for all sequences i in $X_U[i]$ ($X_U[i]$ used as query) we compute the percentage of times that the best matching word in $X_V[j]$ corresponds to a different iteration of the same word. The same is done for each sequence j in $X_V[j]$ ($X_V[j]$ used as query) and the average across all words and speakers is computed. Other two metrics considered are the average computing time per word-pair in milliseconds and the average ratio of computed frame-pair distances in the similarity matrix, as indicators of algorithmic efficiency.

TABLE 1

Comparison of algorithms for sequence matching within context.

| Algorithm | accuracy | avg. time | ratio |
|---|---|---|---|
| Segmental DTW Eucl. | 80.61% | 82.7 ms | 1 |
| Segmental DTW inner prod. | 74.62% | 86.7 ms | 1 |
| U-DTW horiz. bands | 89.53% | 10.6 ms | 0.51 |
| U-DTW diag. bands | 89.34% | 9.0 ms | 0.42 |
| standard DTW | 95.42% | 0.6 ms | — |

Table 1 compares the proposed U-DTW algorithm (using both SP selection methods proposed) with the Segmental-DTW algorithm. U-DTW uses a minimum length $L_{min}=400$ ms and a separation between bands $$T_h = \frac{L\min}{8} \text{ and } T_d = \frac{L\min}{2}.$$

For the segmental DTW, we used a minimum length of 500 ms, 70 ms band size and band overlap of 50%. The original segmental-DTW algorithm uses Euclidean distance as metric between frames while as U-DTW uses the normalized inner product. We also computed segmental-DTW using 1-inner product for comparison purposes.

Columns 2 to 4 of Table 1 indicate the accuracy, average computation time per comparison and the average ratio of computed frame-pairs, respectively. From the results we see that aside from obtaining 9% or more absolute improvement in accuracy using U-DTW versus Segmental-DTW, the computational time is almost 10 times faster. Both U-DTW SP selection methods obtain similar results. However, the diagonal band approach can use slightly larger $\tau_d$ separation between bands and so the ratio of computed distances and the computation time are slightly lower.

Figure 4:
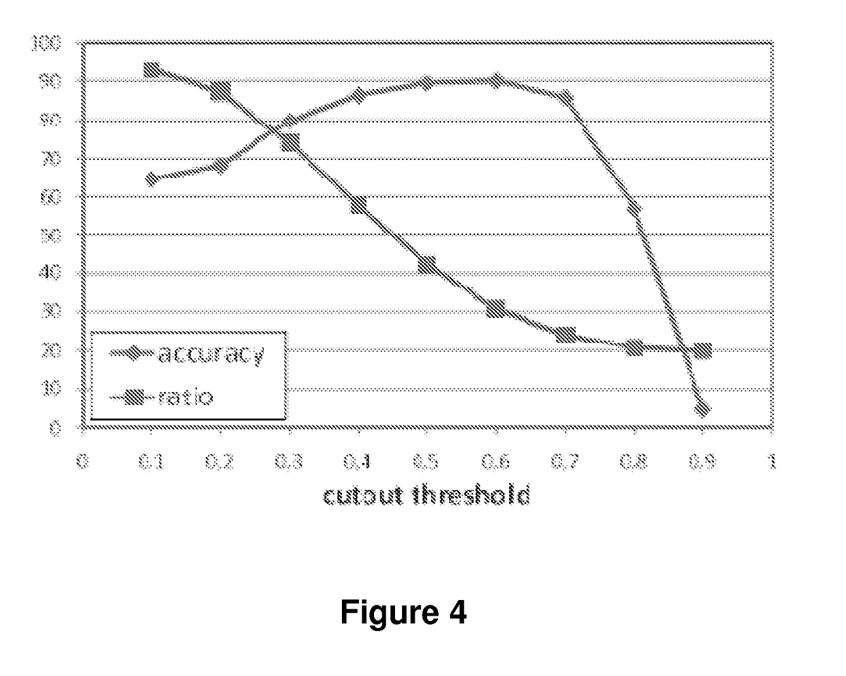
FIG. 4 shows accuracy and the computed frame-pairs ratio as a function of the cutoff threshold.

Finally, we found it useful to compare the proposed algorithm with a standard DTW implementation run only on the words without any context. Such result defines an upper bound on accuracy for the case where exact start-end points were known. By using U-DTW without such knowledge we only lose around 6% accuracy versus standard DTW One important parameter in U-DTW is the cut-off threshold applied to prune non matching paths. If the threshold is set too high there will be many missed paths as correct paths will be cut before reaching minimum length, while if the threshold is too low there will be many false alarms, slowing down the system and leading to wrong final paths. FIG. 4 shows accuracy and the computed frame-pairs ratio as a function of such threshold. Values are computed with a minimum length set to $L_{min}=400$ ms. Optimum accuracy is found at threshold=0.6 (Note that if two sequences were identical their normalized inner product would be 1).

Although the present invention has been described with reference to specific embodiments, it should be understood by those skilled in the art that the foregoing and various other changes, omissions and additions in the form and detail thereof may be made therein without departing from the spirit and scope of the invention as defined by the following claims.

The invention claimed is:

1. A method of determining the matching between a first and a second sampled signals using an improved Dynamic Time Warping algorithm wherein the matching is determined by finding the optimal paths through a matrix of points representing possible time alignments between the signals, the method comprising the steps of:
   (a) generating a sequence of first feature vectors $U:=(u_1; u_2; \ldots; u_M)$ and second feature vectors $V:=(v_1; v_2; \ldots; v_N)$ that represent temporal and spectral behavior of the first and second signals respectively;
   (b) setting a similarity matrix $D_g(m; n)$ and a length matrix $M(m;n)$ as empty at start up;
   (c) defining appropriate synchronization points, SP, in locations (m,n);
   (d) calculating a similarity $S(m;n)$ for the synchronization points, wherein $S(m; n)$ is defined between any two feature vectors, $u_m$ and $v_n$, as a distance between the vectors, and
   (e) for each synchronization point, m;n
      (i) setting $M(m;n)=1$,
      (ii) applying a forward path algorithm for the point,
      (iii) for all paths found in the previous step whose length exceeds the minimum length $L_{min}$, $L_{min}$ being a predefined parameter, applying a backward path algorithm for the synchronization point where the path starts,
      (iv) selecting the longest of all paths that pass through the considered SP and return a total path, backwards and forwards, and its average score if it exceeds the minimum length $L_{min}$ in both dimensions;
   wherein the path algorithms comprise the following steps:
      for the considered point (m; n), set $(m'; n')=(m; n)+(i; j)$, where $(i; j) \in \{(1; 1); (1; 2); (2; 1) \ldots; (r; r-1)\}$ for the forward path and $(i; j) \in \{(-1;-1); (-1;-2); (-2;-1) \ldots (-s;-(s-1))\}$ for the backward path where r and s are predefined parameters;
      for each considered value of m';n' if the following conditions are met:
         the normalized global similarity score of the current path is greater than any previous paths, if any, at that location, wherein $$\frac{Dg(m, n) + S(m', n')}{M(m, n) + 1} > \frac{Dg(m', n')}{M(m' n')}$$

if there is no previous paths at that location $(M(m',n')=0)$, only the second condition is evaluated;
         the normalized global similarity is greater than a predefined cutoff threshold Thr, wherein $$\frac{Dg(m, n) + S(m', n')}{M(m, n) + 1} > Thr$$

adding a new frame-pair position (m'; n') to the currently considered path; M(m', n') is set to $M(m, n)+1$; Dg(m', n') is set to $Dg(m, n)+S(m', n')$ and applying the path algorithm again from the point m';n', the new point m;n being considered is $m;n=m'; n'$; and
      iteratively processing while the conditions are met for each considered point.

2. A method according to claim 1, wherein the position of the synchronization points depends on the minimum matching length $L_{min}$ designed.

3. A method according to claim 1, wherein the synchronization points are defined at positions (m;n) $m=1 \ldots M$ for $n=\tau_h k$ with $$k = 0 \ldots \frac{N}{\tau h},$$

being $\tau_h$ the vertical separation between bands, a design parameter.

4. A method according to claim 3, wherein $$\tau_h = \frac{Lmin}{3}.$$

5. A method according to claim 1, wherein the synchronization points are defined at positions (m;n) where $m+n=k\tau_d$ where $$k = 0 \ldots \frac{\max(M; N)}{\tau d},$$

for m=1 to M and for n=1 to N, being $\tau_d$ a design parameter.

6. A method according to claim 5, wherein $$\tau_d = \frac{Lmin}{2}.$$

7. A method according to claim 1 wherein the first and second sampled signals are acoustic signals.

8. A method according to claim 1, wherein r=2.

9. A method according to claim 1, wherein s=2.

10. A method according to claim 1, wherein the minimum length $L_{min,} \geq 400$ ms.

11. A method according to claim 1, wherein the minimum length $L_{min,}=500$ ms.

12. A method according to claim 1, wherein the distance between two vectors is defined by the normalized inner product or cosine of the angle $\theta$ between the vectors $u_m$ and $v_n$, wherein $$S(m; n) = \cos\theta = \frac{\langle um, vn \rangle}{\|um\|\|vn\|}.$$

13. A system comprising means adapted to perform a method of determining the matching between a first and a second sampled signals using an improved Dynamic Time Wraping algorithm wherein the matching is determined by finding the optimal paths through a matrix of points representing possible time alignments between the signals, the method comprising the steps of:
   (a) generating a sequence of first feature vectors $U:=(u_1; u_2; \ldots; u_M)$ and second feature vectors $V:=(v_1; v_2; ;v_N)$ that represent temporal and spectral behavior of the first and second signals respectively;
   (b) setting a similarity matrix $D_g(m; n)$ and a length matrix $M(m;n)$ as empty at start up;

(c) defining appropriate synchronization points, SP, in locations (m,n);

(d) calculating a similarity S(m;n) for the synchronization points, wherein S(m; n) is defined between any two feature vectors, $u_m$ and $v_n$, as a distance between the vectors, and (e) for each synchronization point, m;n
  (i) setting M(m;n)=1,
  (ii) applying a forward path algorithm for the point,
  (iii) for all paths found in the previous step whose length exceeds the minimum length $L_{min}$, $L_{min}$ being a predefined parameter, applying a backward path algorithm for the synchronization point where the path starts,
  (iv) selecting the longest of all paths that pass through the considered SP and return a total path, backwards and forwards, and its average score if it exceeds the minimum length $L_{min}$ in both dimensions;

wherein the path algorithms comprise the following steps:
  for the considered point (m; n), set (m'; n')=(m; n)+(i; j), where (i; j)∈{(1; 1); (1; 2); (2; 1) . . . ; (r; r−1)} for the forward path and (i; j)∈{(−1;−1); (−1;−2); (−2;−1 . . . (−s;−(s−1))} for the backward path where r and s are predefined parameters;
  for each considered value of m';n' if the following conditions are met:
    the normalized global similarity score of the current path is greater than any previous paths, if any, at that location, wherein $$\frac{Dg(m, n) + S(m', n')}{M(m, n) + 1} > \frac{Dg(m', n')}{M(m'n')}$$

if there is no previous paths at that location (M(m',n')=0), only the second condition is evaluated;
  the normalized global similarity is greater than a predefined cutoff threshold Thr, wherein $$\frac{Dg(m, n) + S(m', n')}{M(m, n) + 1} > Thr$$

adding a new frame-pair position (m'; n') to the currently considered path; M(m', n') is set to M(m, n)+1; Dg(m', n') is set to Dg(m, n)+S(m', n') and applying the path algorithm again from the point m';n', the new point m;n being considered is m;n=m';n'; and
  iteratively processing while the conditions are met for each considered point.

14. A non-transitory machine-readable media configured to store instructions that are executable by a processor for performing a method of determining the matching between a first and a second sampled signals using an improved Dynamic Time Warping algorithm wherein the matching is determined by finding the optimal paths through a matrix of points representing possible time alignments between the signals, the method comprising the steps of:

(a) generating a sequence of first feature vectors U:=($u_1$; $u_2$; . . . ; $u_M$) and second feature vectors V:=($v_1$; $v_2$; ;$v_N$) that represent temporal and spectral behavior of the first and second signals respectively;

(b) setting a similarity matrix $D_g$(m; n) and a length matrix M(m;n) as empty at start up;

(c) defining appropriate synchronization points, SP, in locations (m,n);

(d) calculating a similarity S(m;n) for the synchronization points, wherein S(m; n) is defined between any two feature vectors, $u_m$ and $v_n$, as a distance between the vectors, and (e) for each synchronization point, m;n
  (i) setting M(m;n)=1,
  (ii) applying a forward path algorithm for the point,
  (iii) for all paths found in the previous step whose length exceeds the minimum length $L_{min}$, $L_{min}$ being a predefined parameter, applying a backward path algorithm for the synchronization point where the path starts,
  (iv) selecting the longest of all paths that pass through the considered SP and return a total path, backwards and forwards, and its average score if it exceeds the minimum length $L_{min}$ in both dimensions;

wherein the path algorithms comprise the following steps:
  for the considered point (m; n), set (m'; n')=(m; n)+(i; j), where (i; j)∈{(1; 1); (1; 2); (2; 1) . . . ; (r; r−1)} for the forward path and (i; j)∈{(−1;−1); (−1;−2); (−2;−1 . . . (−s;−(s−1))} for the backward path where r and s are predefined parameters;
  for each considered value of m';n' if the following conditions are met:
    the normalized global similarity score of the current path is greater than any previous paths, if any, at that location, wherein $$\frac{Dg(m, n) + S(m', n')}{M(m, n) + 1} > \frac{Dg(m', n')}{M(m'n')}$$

if there is no previous paths at that location (M(m',n')=0), only the second condition is evaluated;
  the normalized global similarity is greater than a predefined cutoff threshold Thr, wherein $$\frac{Dg(m, n) + S(m', n')}{M(m, n) + 1} > Thr$$

adding a new frame-pair position (m'; n') to the currently considered path; M(m', n') is set to M(m,n)+1; Dg(m', n') is set to Dg(m, n)+S(m', n') and applying the path algorithm again from the point m';n', the new point m;n being considered is m;n=m';n'; and
  iteratively processing while the conditions are met for each considered point, wherein the instructions are executed on a computer, a digital signal processor, a field-programmable gate array, an application-specific integrated circuit, a microprocessor, a micro-controller, or any other form of programmable hardware.

* * * * *